(12) United States Patent
Berger et al.

(10) Patent No.: US 8,966,734 B2
(45) Date of Patent: Mar. 3, 2015

(54) METHOD OF JOINING MAGNESIUM

(75) Inventors: Elisabeth J. Berger, Farmington Hills, MI (US); Jon T. Carter, Farmington, MI (US); Peter H. Foss, Oxford, MI (US); Leonid C. Lev, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 13/241,635

(22) Filed: Sep. 23, 2011

(65) Prior Publication Data

US 2013/0074312 A1 Mar. 28, 2013

(51) Int. Cl.
| | |
|---|---|
| *B23P 11/00* | (2006.01) |
| *B21D 39/03* | (2006.01) |
| *B21J 15/14* | (2006.01) |
| *F16B 5/00* | (2006.01) |
| *F16B 5/04* | (2006.01) |
| *B29C 65/64* | (2006.01) |
| *B29C 65/00* | (2006.01) |
| *B29L 31/30* | (2006.01) |

(52) U.S. Cl.
CPC ............... *B21D 39/031* (2013.01); *F16B 5/00* (2013.01); *F16B 5/045* (2013.01); *B29C 65/64* (2013.01); *B29C 66/1122* (2013.01); *B29C 66/43* (2013.01); *B29C 66/721* (2013.01); *B29C 66/7392* (2013.01); *B29C 66/742* (2013.01); *B29L 2031/30* (2013.01); *B21J 15/14* (2013.01)
USPC .................. 29/447; 29/505; 29/521; 29/527.1

(58) Field of Classification Search
CPC ................................ B21D 39/031; F16B 5/00

USPC ................. 29/447, 505, 521, 525.01, 525.13, 29/527.1, 527.2, 460
See application file for complete search history.

(56) References Cited

U.S. PATENT DOCUMENTS

| | | | |
|---|---|---|---|
| 2,458,452 | A | 1/1949 | Vanni |
| 2,510,693 | A | 6/1950 | Green |
| 2,685,813 | A | 8/1954 | Lampman et al. |
| 3,512,224 | A * | 5/1970 | Newton ..................... 411/447 |
| 4,133,096 | A | 1/1979 | Falcioni |
| 4,478,544 | A | 10/1984 | Strand |

(Continued)

FOREIGN PATENT DOCUMENTS

| | | | |
|---|---|---|---|
| CN | 103016477 A | 4/2013 | |
| DE | 19500790 A1 | 7/1996 | |

(Continued)

OTHER PUBLICATIONS

"TOX—ClinchRivet Ingeniously simple", Data sheet, TB 80.04_200904.en, 4 pages.

(Continued)

*Primary Examiner* — Jermie Cozart
(74) *Attorney, Agent, or Firm* — Harness, Dickey & Pierce, P.L.C.

(57) ABSTRACT

Methods of joining a magnesium substrate to a second substrate are provided. A region of the magnesium substrate and a region of the second substrate are aligned to provide an overlap. A region of the overlap is deformed to provide a joint. A polymeric material is disposed in the joint to secure together the magnesium substrate and the second substrate. The joining of the magnesium substrate and the second substrate is facilitated by using a die in various aspects.

21 Claims, 4 Drawing Sheets

(56) References Cited

U.S. PATENT DOCUMENTS

| | | | |
|---|---|---|---|
| 4,687,396 | A | 8/1987 | Berecz |
| 4,736,507 | A | 4/1988 | Berecz et al. |
| 4,831,704 | A | 5/1989 | Rapp |
| 4,897,912 | A | 2/1990 | Slasinski |
| 5,051,020 | A | 9/1991 | Schleicher |
| 5,203,812 | A | 4/1993 | Eckold et al. |
| 5,361,483 | A | 11/1994 | Rainville et al. |
| 6,684,479 | B2 | 2/2004 | Wang et al. |
| 6,694,597 | B2 * | 2/2004 | Wang et al. ............... 29/525.06 |
| 6,732,420 | B2 * | 5/2004 | Wang et al. ............... 29/525.06 |
| 7,377,021 | B2 * | 5/2008 | Mauermann et al. ...... 29/525.05 |
| 7,698,797 | B2 * | 4/2010 | Hetrick et al. ................. 29/505 |
| 7,937,816 | B2 * | 5/2011 | Droulez et al. ............. 29/283.5 |
| 7,996,975 | B1 * | 8/2011 | Denslow ..................... 29/419.1 |
| 8,024,848 | B2 | 9/2011 | Carter |
| 2005/0120532 | A1 * | 6/2005 | Mauermann et al. .......... 29/428 |
| 2005/0125985 | A1 * | 6/2005 | Adams et al. ................ 29/524.1 |
| 2005/0177993 | A1 * | 8/2005 | Bergkvist ........................ 29/514 |
| 2008/0149256 | A1 * | 6/2008 | Wang et al. ..................... 156/92 |
| 2012/0124816 | A1 | 5/2012 | Berger et al. |

FOREIGN PATENT DOCUMENTS

| | | | | |
|---|---|---|---|---|
| DE | 10102712 B4 | | 1/2001 | |
| DE | 102004002593 A1 | * | 7/2004 | ............ B23Q 17/00 |
| DE | 102004053130 A1 | * | 5/2006 | |
| DE | 102012216731 A1 | | 3/2013 | |
| JP | 07268244 A | * | 10/1995 | |
| WO | 2004/085144 A2 | | 10/2004 | |
| WO | WO 2004085144 A2 | * | 10/2004 | |

OTHER PUBLICATIONS

U.S. Appl. No. 12/952,246, filed Nov. 23, 2010 Berger et al.

* cited by examiner

METHOD OF JOINING MAGNESIUM

FIELD

The present disclosure relates to methods of joining magnesium to magnesium or joining magnesium to another metal or non-metal substrate using a polymeric plug.

BACKGROUND

This section provides background information related to the present disclosure which is not necessarily prior art.

Metal sheets are joined to form structural components, cosmetic components, or for other purposes. To form an exemplary structural component, the sheets may be joined by using fasteners such as bolts and rivets which may be made of stainless steel or another material.

In automotive applications, different types of sheet metal are used for varying purposes. For example, magnesium may be selected as the metal sheet due to its high strength and relatively low weight. However, where at least one magnesium sheet is used, a concern is galvanic corrosion at the interface of a non-magnesium fastener and the magnesium sheet or at the interface of the magnesium sheet and any other non-magnesium sheet joined to the magnesium sheet. As such, there are limitations to using magnesium and magnesium alloys in manufacturing.

SUMMARY

This section provides a general summary of the disclosure, and is not a comprehensive disclosure of its full scope or all of its features.

In various aspects, the present teachings provide methods of joining a magnesium substrate to a second substrate. A region of the magnesium substrate is aligned with a region of the second substrate to provide an overlap. A region of the overlap is deformed to provide a joint. A polymeric material is disposed into the joint.

In other aspects, the present teachings provide methods of joining a magnesium substrate to a second substrate. A region of the magnesium substrate and a region of the second substrate are aligned to provide an overlap. The overlap is located between a first die and a second die. A polymer is injected from the first die towards the overlap to cause the overlap to deform towards the second die and to contact with a surface of the second die. The polymer is then solidified to interlock the magnesium substrate and the second metal substrate. The newly formed assembly is removed from the die set.

In still other aspects, the present teachings provide methods of joining a magnesium substrate to a second substrate. A region of the magnesium substrate and a region of the second substrate are aligned to provide an overlap. At least one of the magnesium substrate and the second substrate includes a non-conductive coating that contacts the other respective substrate. A region of the overlap is deformed to provide a joint while leaving the overlap intact. A polymeric material is disposed into the joint.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
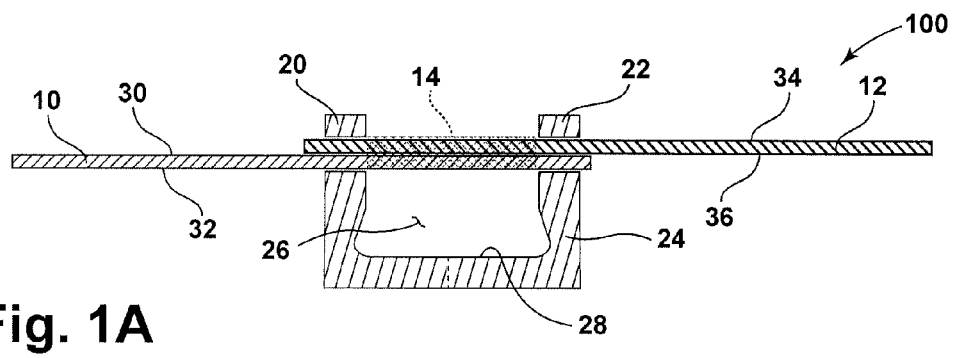
FIGS. 1A-1F depict an exemplary process of joining a magnesium substrate to a second substrate according to various aspects of the present teachings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In various aspects, the present teachings provide methods of securing a magnesium substrate to a second substrate while mitigating galvanic corrosion. As used herein, a "magnesium substrate" includes a workpiece or sub-part that includes at least about 75% by weight of magnesium. The second substrate is either another magnesium substrate or a different substrate, such as a metal or a non-metal substrate such as a reinforced thermoplastic, as non-limiting examples. The workpiece is a sheet of the material that is suitable for the particular manufacturing purposes. For example, in automotive applications the thickness of the sheet(s) is selected for whether the sheet forms a portion of a door panel or a portion of an engine component or some other component.

"Sheet metal" or a "sheet" of the present teachings has a thickness measured as a gauge, generally from 0 to 36 gauge. In the alternate, the sheet metal or sheet has a thickness of from greater than or equal to about 0.1 millimeters to less than or equal to about 8.0 millimeters, including all sub-ranges. Where multiple metal sheets are employed, the sheets are either the same thickness or different thicknesses. While sheet metal is detailed in the present disclosure, other metal structures to be joined (such as tubes, blocks, coils, etc.) are also suitable for securing using the present teachings. Where a non-metal sheet is used, the thicknesses are the same as those detailed above.

The "galvanic corrosion" mitigated according to various aspects refers to a phenomenon in which a less noble metal (more susceptible to corrosion) acts as an anode, and a more noble metal (less susceptible to corrosion) acts as a cathode to form a cell or battery where the less noble metal corrodes preferentially. For example, where a magnesium metal (less noble) is brought into contact with stainless steel (more noble), the magnesium metal corrodes preferentially. If the magnesium metal is brought into contact with nickel, which is even more noble than stainless steel, the rate of galvanic corrosion would be greater due to the increased relative difference in nobility.

This galvanic corrosion causes pitting and other surface damage. If this damage occurs at seams or interfaces between subcomponents of a part, it may reduce longevity, cause undesired cracks or breaks, and/or result in decreased performance of the part. Galvanic corrosion should be prevented to avoid premature and/or undesirable degradation of components.

Because magnesium is particularly susceptible to galvanic corrosion, any adjacent substrate or fasteners used to secure the substrates together must be carefully selected. In the present teachings, the methods employ polymeric fasteners as opposed to metal fasteners as polymers are generally non-reactive with the magnesium substrate and particularly suitable for the disclosed fixation techniques. Subsequently, the methods provide lightweight joining of magnesium pieces without the use of steel rivets, which can promote severe galvanic corrosion. This prevents cracking of the magnesium which is sometimes seen during insertion of self-piercing steel rivets. In addition to preventing the cracking, the use of the polymer fasteners of the present teachings further prevents the structural rotting that may be caused by galvanic corrosion.

Referring to FIGS. 1A-1D, an exemplary method according to the present teachings is depicted using an assembly 100. As shown in FIG. 1A, a first substrate 10 and a second substrate 12 are aligned to provide an overlap 14. While only two substrates 10, 12 are depicted, it is understood that more than two substrates may be used within the scope of the present teachings. Further, the first substrate 10 and the second substrate 12 may be of different sizes, shapes, or thicknesses.

The overlap 14 is disposed within a die 20. The die 20 as depicted in a generically shaped die that includes an upper portion 22 and a lower portion 24. The lower die portion 24 defines a die cavity 26 defined by inner die wall 28.

Figure 1B:
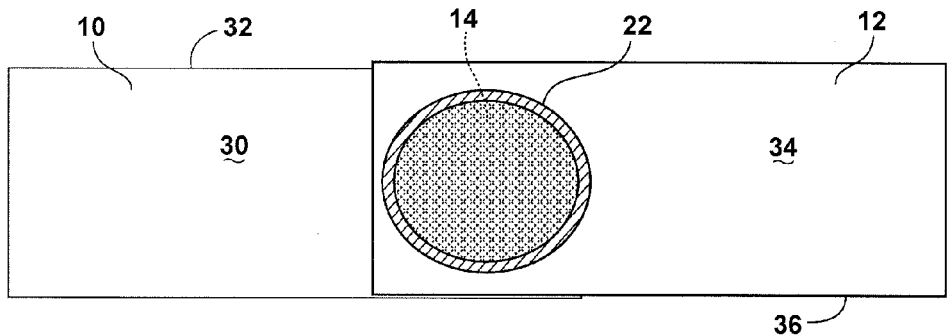

The overlap 14 is fixtured between the upper die portion 22 and the lower die portion 24. As shown in FIG. 1B, the overlap 14 is fully encircled by the upper die portion 22. While the fully encircled overlap 14 is detailed in the instant teachings, it is understood that the overlap 14 may have a partial perimeter about it as shaped by the contour of the upper die portion 22 and/or the lower die portion 24, for example at discrete points (i.e.: two or more separate points that are spaced apart) or as a disconnected shape (i.e.: a J-shape or a semicircle, as non-limiting examples).

Aligning the first substrate 10 and the second substrate 12 to form the overlap 14 allows for securing of the first substrate 10 to the second substrate 12. As non-limiting example of securing, clinching is suitable for use in the present teachings. Clinching is used to secure together substrates, like metal and non-metal sheets. Clinching includes stamping or otherwise forming corresponding indentations in at least two stacked metal sheets for mechanically fitting the sheets to each other.

In select aspects, either one of the upper die portion 22 or the lower die portion 24 is electrically or thermally connected to a heat source to warm either the first substrate 10 and/or the second substrate 12 or both. By heating either or both of the substrates, the amount of force required for the deformation is reduced due to the heat-induced malleability of the first substrate 10 and/or the second substrate 12. The heating may be to a softening or deformation temperature of the respective metal(s) or non-metal substrate. As used herein, the softening or deformation temperature is a temperature that is less than the melting point of the respective metal but that is greater than the temperature at which the respective metal is solid as well-known by one of skill in the art. By heating the substrates 10, 12, the likelihood of cracking is greatly reduced.

For example, with the magnesium alloy AZ31B, the melting temperature is approximately 630 degrees C. to provide a liquid alloy. The softening temperature is actually a range of temperatures that is less than the melting point. An exemplary softening or deformation temperature of the AZ31B magnesium alloy is from about 250 degrees C. to about 500 degrees C., including all sub-ranges.

The overlap 14 provides the areas of the first substrate 10 and the second substrate 12 that are deformed. In select aspects, the overlap 14 is deformed and is not pierced or otherwise destroyed.

Figure 1C:
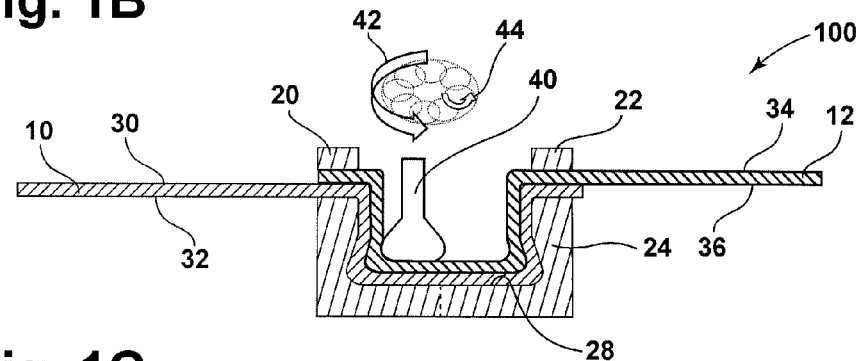

Turning to FIG. 1C, a bulbous tip 40 is depicted as being pressed against the overlap 14 in a circular pattern indicated by arrows 42 and 44. As the bulbous tip 40 is rotated and exerts a pressure against the first substrate 10 and the second substrate 12, the overlap 14 is advanced towards the inner wall 28 of the die 20. When the overlap is in close contact with the inner wall 28, the bulbous tip 40 presses the overlap 14 against the inner wall 28 which in turn resists the force from the bulbous tip 40 to shape the overlap 14 and cause it to contact with the contours of an inner wall 28 of the die 20. In other aspects, the bulbous tip matches at least a portion of the shape of the inner wall 28 of the die 20.

The multiple circular patterns indicated at arrows 42 and 44 assure that the deformed shape of the overlap 14 matches the shape of the interior wall 28. The circular (or other directional) movement of the bulbous tip 40 is continued until the desired level of contouring is achieved. Still further, the bulbous tip 40 is able to travel up and down to push the overlap 14 against the inner wall 28. The shaping of the overlap 14 results in the sheets 10 and 12 being secured, and particularly, the sheet 12 having an undercut to prevent peel.

Figure 1D:
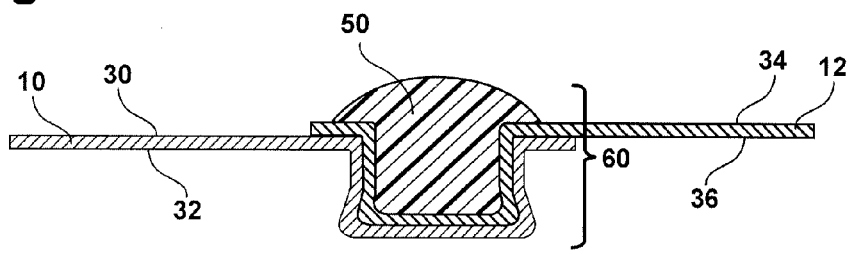

As stated above, the first substrate 10 and second substrate 12, and optionally at least a portion of the die 20 (and thus at least a portion of one of the first substrate 10 and the second substrate 12) are heated in select aspects to more easily allow the bulbous tip 40 to deform the overlap 14. The deformed overlap 14 as shown at FIG. 1C forms a depression for a polymer plug 50 as shown in FIG. 1D. The polymer plug 50 holds the shape of the clinch and also prevents migration of moisture and debris. A general description of the polymer plug 50 is provided first followed by exemplary materials that are suitable for use as the polymer plug 50.

Figure 1E:
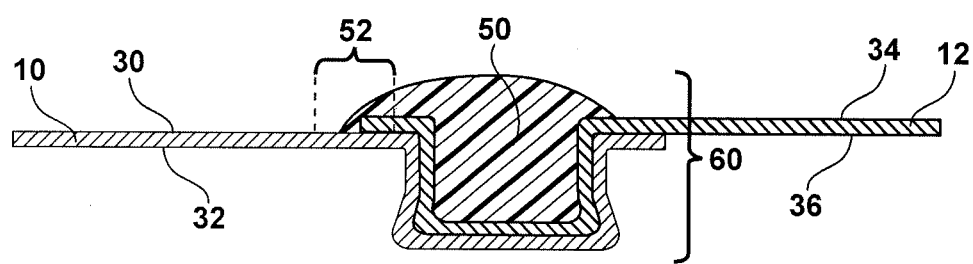
Figure 1F:
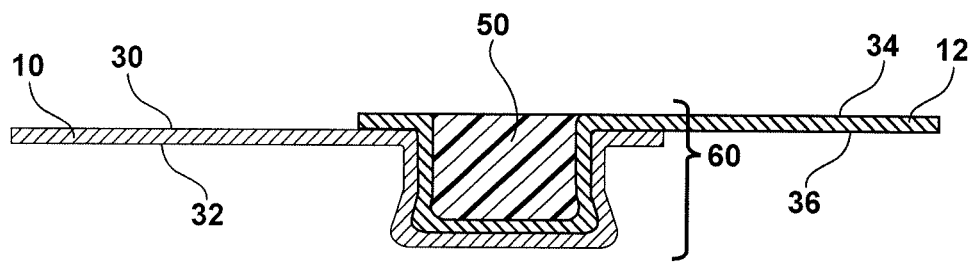

The polymer plug 50 secures the joint 60. In various aspects, the polymer plug 50 is placed in the joint 60 or compressed in the joint 60 so that it sits in different orientations with respect to the first substrate 10 or the second substrate 12. As shown in FIG. 1D, the polymer plug 50 sits proud with respect to the upper surface 34 of the second substrate 12. As shown in FIG. 1E, the polymer plug 50 both sits proud with respect to the upper surface of the second substrate 12 and also extends over to a region of the first substrate 10. This extension 52 provides an additional barrier for the interface of the first substrate 10 and the second substrate 12. As shown in FIG. 1F, the polymer plug 50 sits flush with the upper surface 34 of the second substrate 12. Regardless of the relative height of the polymer plug 50, the joint 60 is protected from unwanted migration of water or other debris due to compression or curing of the plug, as detailed later herein.

The second substrate 12 includes an upper surface 34 and a lower surface 36 while the first substrate 10 includes an upper surface 30 and a lower surface 32. The orientation of the polymer plug 50 with respect to the upper surface 34 of the second substrate 12 or the upper surface 30 of the first substrate may be modified by compressing the polymer plug 50 once it is placed in the joint 60. The orientation of the polymer plug 50 is also modifiable by filling the joint 60 with more or less of the polymer.

In various aspects, the polymer is selected from a thermoplastic polymer or a thermosetting polymer. Where the polymer is thermoplastic, it may be readily shaped at a temperature greater than the glass transition temperature or melting temperature of the polymer, while retaining maximum strength at ambient temperature, or about 25 degrees C. Suitable thermoplastics include polyamide or polypropylene for select uses. In structures which experience the automotive paint bake cycle (160 to 200 degrees C. for at least 20 minutes), high performance thermoplastics with a relatively high glass transition or crystallization temperature, such as polyphthalamide, polyphenylene sulfide, polyamide-imide, polyether sulphone, and polyarylene ketone, among others, may be employed.

Thermosetting polymers (thermosets) are also suitable for use in the present teachings. As compared to thermoplastics, thermosets demonstrate superior creep resistance and dimensional stability and are also suitable for a higher temperature exposure. In select aspects, these are B-staged epoxies or a crosslinkable thermoset below its glass transition temperature. B-staged epoxies include those in which only limited reaction between the resin and hardener has taken place so that the product is in a semi-cured, highly-viscous, but deformable state. In various aspects, deformation is facilitated at mildly elevated temperatures. Depending on their formulation the partial cure of such B-staged epoxies occurs at room temperature, about 25 degrees C., or at more elevated temperatures.

Suitable examples include: epoxy resins, such as diglycidyl ether of bisphenol-A based resin (such as those sold by Momentive Specialty Chemicals of Columbus, Ohio under the tradename Hexion Epon 828) or novalac-based resin (such as those sold by Momentive Specialty Chemicals of Columbus, Ohio under the tradename Hexion Epon SU-2.5) cured with an amine, anhydride, or imidazole curing agent; unsaturated polyester resins, such as those based on propylene glycol cured with a peroxide and, optionally, thickened with magnesium oxide; and a vinyl ester resin (such as those sold by Ashland Composite Polymers of Covington, Ky. under the tradename Derakane) cured with a peroxide and, optionally, thickened with magnesium oxide.

Polymer plugs 50 made of thermosetting polymers may require an elevated temperature cure so that they may be inserted and upset at room temperature or about 25 degrees C. After insertion and upsetting, at least local application of heat to the polymer plug 50 will enable the polymer to cure and develop maximum strength to secure or interlock the joint 60. Curing is achieved by using heat lamps, heated tooling, or by placing the joint 60 (and workpiece) in an oven or furnace, for example a paint bake oven. Any curing processes known in the art are suitable for use in the present teachings including exposure to ultraviolet radiation or exposure to electron beams.

Optionally, the polymer includes fiber reinforcements. Suitable fiber reinforcements may include glass and aramid fibers. Carbon fibers are also suitable provided they can be assuredly isolated from the magnesium. Mixed fibers are also suitable and are provided as a braid, a bunch, group, or as individual fibers. Where carbon fibers are used, the fibers are positioned in the interior of a braided aramid or glass fiber sleeve, as non-limiting examples, to assure isolation of the carbon fibers. Fibers are uniformly distributed across the body cross-section or positioned selectively, for example to provide selective reinforcement or to facilitate upsetting with minimal fiber damage, or, as in the case of carbon fibers, to locate them out of possible contact with the workpiece(s). Natural fibers, such as bast fibers, including hemp and jute are also suitable for use in the present teachings.

In select aspects, the polymer or polymer and fiber materials to be formed into the plug 50 are preheated to a temperature greater than the glass transition temperature of the polymer where a thermoplastic polymer is employed. On the other hand, thermosets such as B-staged epoxies and other crosslinkable thermosets may be inserted while at ambient temperatures so long as the temperature is below the glass transition temperature.

Fiber reinforcements may be either short fiber (generally less than 2 mm) or long fibers (from about 2 mm to the full length of the plug.) A long fiber-reinforced plug 50 may be readily formed using pultrusion or extrusion to form an extended length of fiber-reinforced material and then cutting the extended length to form bodies of appropriate length. Although the body may preferably be circular in cross-section, both pultrusion and extrusion are suitable for preparing bodies of other than circular cross-section, including irregular cross-sections, if preferred.

Alternatively, short fibers may be used, which will be mixed with the polymeric thermoplastic or thermoset resin when it is above its melting temperature.

The dimensions of the plug 50 should be chosen to enhance joint strength. In various aspects, the polymer is solidified under pressure. This allows the polymer plug 50 to retain its shape and provide a barrier for the joint 60. The pressure can include pressure while the polymer is curing or cooling. The solidified polymer plug 50 secures the joint 60 and provides the structural integrity to the system. Because the polymer plug 50 is employed, a magnesium substrate may be employed as at least one of the first substrate 10 or the second substrate 12.

Once in place and cured or hardened, the polymer plug 50 interlocks the joint 60. The polymer plug 50 prevents corrosion at the interface of the first substrate 10 and the second substrate 12. The joint 60 is interlocked such that the workpiece having the joint 60 is structurally sound and performs in the intended manner. Notably, the split in the lower die 24, as best shown in FIGS. 1A and 1C allows the lower die to be separated for removal from the formed clinch.

Figure 2A:
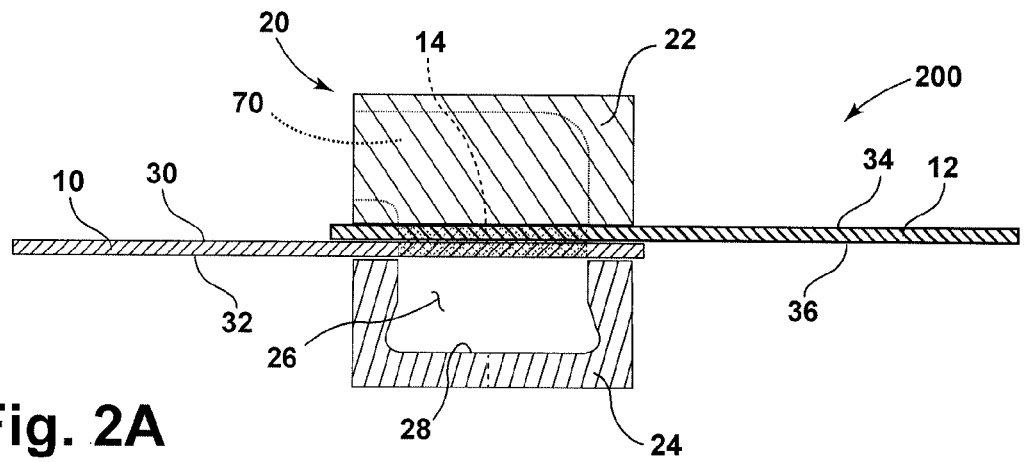
FIGS. 2A-2C depict an exemplary process of joining a magnesium substrate to a second substrate using hydrostatic force from a flowing polymer according to various aspects of the present teachings.
Figure 2B:
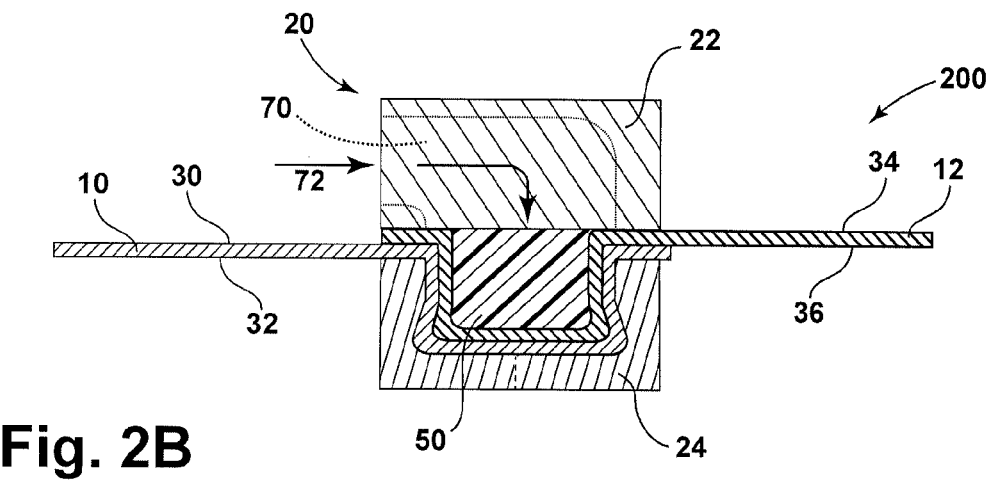
Figure 2C:
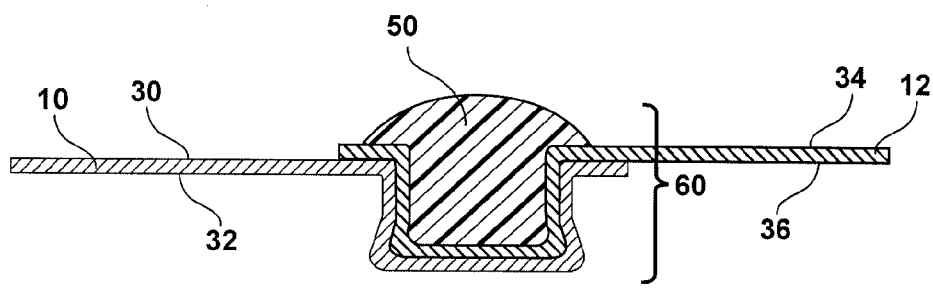

Turning to FIGS. 2A-2C, in still other aspects and as noted with assembly 200, methods of joining the first substrate 10 and the second substrate 12 include forming the joint 60 while simultaneously placing the polymer plug 50. A region of the first substrate 10 and a region of the second substrate 12 are aligned to form the overlap 14. The overlap 14 is located between the upper die portion 22 and the lower die portion 24. A polymer, such as those detailed above is injected from the upper die portion 22 through a passage 70 defined by the upper die portion 22. The polymer is pre-heated so that it is molten when traveling through the passage 70 along path 72, or the polymer is heated once it is within the die 20.

The polymer is advanced towards the overlap 14 at a sufficient pressure and speed to push the overlap 14 towards the lower die portion 24 to cause the overlap to contact with the inner surface 28 of the die 20. The amount of pressure and speed needed to deform the overlap 14 depends on the thickness of the first substrate 10 and the second substrate 12 and size of the desired joint 60. Further, the temperature of the first substrate 10 and the second substrate 12 also partly determines the resistance to deformation. To facilitate shaping, at least one of the first substrate 10 and the second substrate 12 are heated in various aspects of the present teachings. A thicker overlap 14 would require that the polymer is advanced at a greater force than a relatively thinner overlap 14. The polymer fills the cavity 26 and causes the overlap 14 to have the same contour as the inner surface 28 of the lower die portion 24.

The delivery of the polymer through the passage 70 is terminated when the desired amount of polymer is delivered. For example, to prepare a polymer plug 50 intended to be flush with the upper surface 34 of the second substrate 12 as depicted in FIG. 1F may require an earlier termination of polymer delivery as compared to the preparation of a polymer plug 50 intended to cover the shoulder 52 as depicted in FIG. 1E.

The polymer plug 50 is then solidified as detailed above to interlock the first substrate 10 with the second substrate 12. For a thermoset polymer, various post processing steps including curing with a heat lamp, passing through an oven, exposing to UV light, or exposing to an electron beam as detailed above are applied, as needed to the polymer plug 50 to secure the joint 60. A thermoplastic plug would be solidified by cooling to below the glass transition temperature or melting temperature.

Figure 3A:
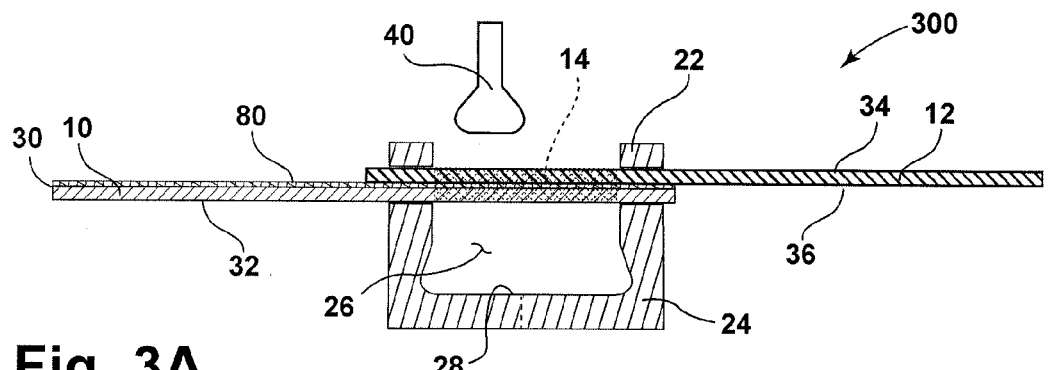
FIGS. 3A-3C depict an exemplary process of joining a magnesium substrate to a second substrate, where the substrates have an intermediary layer according to various aspects of the present teachings.
Figure 3B:
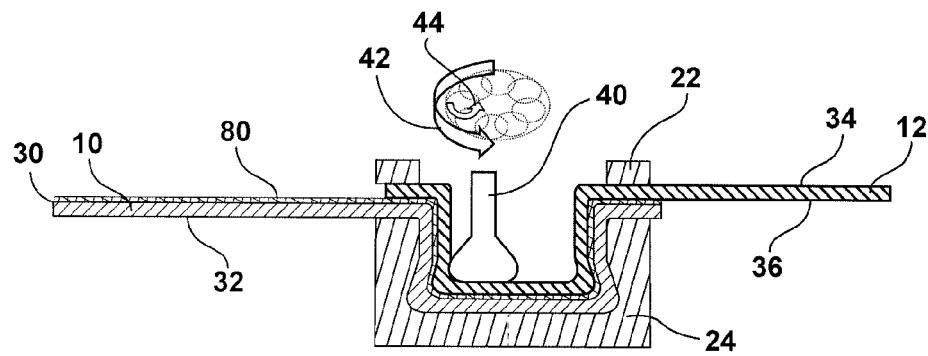
Figure 3C:
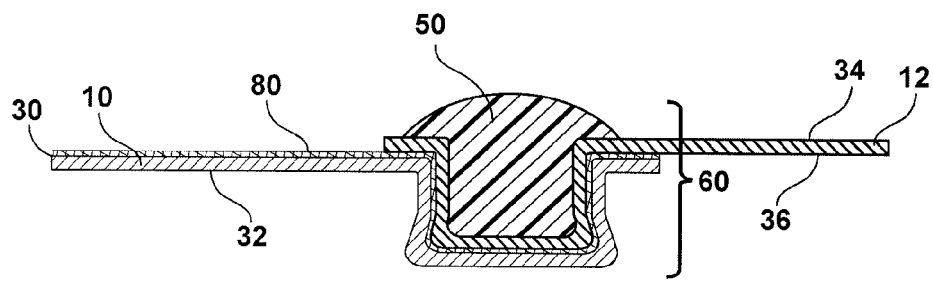

In still other aspects one of the first substrate 10 and the second substrate 12 includes a non-conductive coating 80, as noted with assembly 300. With reference to FIGS. 3A-3C, the non-conductive coating 80 contacts at least one of the substrates and serves as a barrier between at least a portion of the first substrate 10 and the second substrate 12. As shown in FIG. 3A, the non-conductive coating 80 is on the upper surface 30 of the first substrate 10. As such, the non-conductive coating 80 contacts the lower surface 36 of the second substrate 12 and is sandwiched between the first substrate 10 and the second substrate 12 where they confined within the die 20.

The non-conductive coating is made of any suitable material. An exemplary set of materials for the non-conductive coating includes high strain materials including those classified as a polyolefin, a diene, a polystyrene, a polyamide, a polyester, a polyurethane, a fluorine-type elastomer, a silicon-type elastomer, and the like, used alone or in combination, as non-limiting examples. Still further, a ceramic material may be used in various aspects as the non-conductive coating 80.

Although the non-conductive coating 80 is depicted as being the same length as the first substrate 10, it is within the scope of the present teachings for the non-conductive coating 80 to be shorter than or longer than the first substrate 10 and/or second substrate 12. It is also within the scope of the present teachings to have more than one non-conductive coating 80 in the system.

The non-conductive coating 80 serves as the barrier to prevent galvanic corrosion of the magnesium while still optimizing the use of the light weight and high strength materials. The non-conductive coating 80 may be particularly useful when one of the first substrate 10 and the second substrate 12 is made of magnesium and the other is another metal.

As detailed previously, the polymeric material is disposed into the joint 60 to interlock the first substrate 10 and the second substrate 12. The polymeric material includes the thermoset and thermoplastic materials detailed above. Optionally, the fibers detailed above are incorporated into the polymer materials as detailed above. The polymer is delivered after shaping the overlap 14 to contact the contours of at least a portion of the die 20 in various aspects, for example, by shaping with a bulbous tip as shown in FIG. 3B. In still other aspects, the polymer is delivered through the passage 70 along path 72 as depicted in FIGS. 2A-2C to shape the first substrate 10, the non-conductive coating 80, and the second substrate 12. In select aspects, at least one of the die 20, the first substrate 10, and the second substrate 12 is connected to a source of electrical or thermal heat to soften at least one of the first substrate 10 and second substrate, as detailed above.

The polymer plug 50 is then solidified as detailed above to interlock the first substrate 10 with the second substrate 12. Various post processing steps including curing with a heat lamp, passing through an oven, exposing to UV light, or exposing to an electron beam as detailed above are applied, as needed to the polymer plug 50 to secure the joint 60.

In summary, the present teachings provide methods of joining a magnesium substrate to a second metal substrate. A region of the magnesium substrate and a region of the second substrate are aligned to provide an overlap. A region of the overlap is deformed to provide a joint. A polymeric material is disposed in the joint. The overlap is disposed in a die. Deforming a region of the overlap further includes contouring the overlap to contact a surface of the die. The deforming of a region of the overlap is selected from hot clinching and shaping with a bulbous tip. Where the overlap is shaped with a bulbous tip, the die is optionally heated to heat a region of the overlap.

The polymer is optionally melted and then solidified under pressure. The polymeric material is cured or cooled to form a plug. The joint is secured with the plug. The upper surface of the plug is substantially flush with an upper surface of the overlap according to various aspects. The second substrate is the same material as the magnesium substrate, or the second substrate is a different material than the magnesium substrate.

In still other features of the present teachings, a method of joining a magnesium substrate to a second metal substrate includes aligning a region of the magnesium substrate and a region of the second substrate to provide an overlap, where the overlap is located between a first die and a second die. A polymer is injected from the first die towards the overlap to cause the overlap to deform towards the second die and to contact a surface of the second die. Injecting the polymer from the first die towards the second die creates a joint connecting the magnesium substrate and the second metal substrate. The polymer is solidified to interlock the magnesium substrate and the second metal substrate.

The magnesium substrate and the second substrate are heated above a deformation temperature. The heating may be achieved by heating at least one of the first die and the second die or other suitable means.

In yet other aspects of the present teachings methods of joining a magnesium substrate to a second metal substrate include aligning a region of the magnesium substrate and a region of the second metal substrate to provide an overlap, where at least one of the magnesium substrate and the second metal substrate includes a non-conductive coating that contacts the other respective substrate. The non-conductive coating includes a material with strain properties high enough to accommodate the deformation of the workpiece. A region of the overlap is deformed to provide a joint while leaving the overlap intact. A polymeric material is disposed into the joint.

Where the overlap is located between a first die and a second die, a polymer is injected from the first die towards the overlap to cause the overlap to deform towards the second die and to contact a surface of the second die in select features. In other features, the overlap is secured in a die and deformed using a bulbous tip. In still other features, the polymeric material is solidified to interlock the magnesium substrate and the second metal substrate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of joining a magnesium substrate to a second substrate comprising:
    aligning a region of the magnesium substrate and a region of the second substrate to provide an overlap;
    disposing the overlap within a die;
    deforming a region of the overlap to provide a joint, wherein the deforming comprises shaping by moving a bulbous tip over the overlap to press the overlap against an inner wall of the die; and
    disposing a polymeric material into the joint.

2. The method of claim 1, further comprising heating the die to heat the region of the overlap.

3. The method of claim 1, further comprising melting the polymeric material and solidifying the polymeric material under pressure.

4. The method of claim 1, wherein disposing the polymeric material into the joint further comprises curing or cooling the polymeric material to form a plug.

5. The method of claim 4, further comprising securing the joint with the plug.

6. The method of claim 4, wherein an upper surface of the plug is substantially flush with an upper surface of the overlap.

7. The method of claim 1, wherein the second substrate comprises the same material as the magnesium substrate.

8. The method of claim 1, wherein the magnesium substrate and the second substrate are made of different materials.

9. A method of joining a magnesium substrate to a second substrate comprising:
    aligning a region of the magnesium substrate and a region of the second substrate to provide an overlap having a shoulder, wherein the overlap is located between a first die and a second die;
    injecting a polymer from the first die towards the overlap to cause the overlap to deform towards the second die and to contact a surface of the second die; and
    solidifying the polymer to interlock the magnesium substrate and the second substrate, wherein the polymer extends to cover the shoulder of the overlap.

10. The method of claim 9, further comprising heating the magnesium substrate and the second substrate above a deformation temperature.

11. The method of claim 10, further comprising heating at least one of the first die and the second die.

12. The method of claim 9, wherein injecting the polymer from the first die towards the second die creates a joint connecting the magnesium substrate and the second substrate.

13. A method of joining a magnesium substrate to a second metal substrate comprising:
    aligning a region of the magnesium substrate and a region of the second metal substrate to provide an overlap, wherein at least one of the magnesium substrate and the second metal substrate includes a non-conductive coating that contacts the other respective substrate;
    disposing the overlap between a first die comprising a die cavity defined by an inner surface and a second die; and
    injecting a polymeric material towards the overlap to cause a region of the overlap to be contoured to the inner surface of the die cavity of the first die by deforming a region of the overlap by exerting pressure to provide a joint while leaving the overlap intact.

14. The method of claim 13, wherein the non-conductive coating comprises a material able to withstand deformation of the overlap.

15. The method of claim 13, further comprising solidifying the polymeric material to interlock the magnesium substrate and the second metal substrate.

16. The method of claim 13, wherein the second metal substrate comprises magnesium.

17. The method of claim 13, wherein the magnesium substrate and the second metal substrate are made of different materials.

18. The method of claim 13, wherein the non-conductive coating comprises a material selected from the group consisting of: a polyolefin, a diene, a polystyrene, a polyamide, a polyester, a polyurethane, a fluorine-type elastomer, a silicon-type elastomer, and combinations thereof.

19. The method of claim 13, wherein the polymeric material is selected from the group consisting of: polyamide, polypropylene, polyphthalamide, polyphenylene sulfide, polyamide-imide, polyether sulphone, polyarylene ketone, and combinations thereof.

20. The method of claim 13, wherein the polymeric material is selected from the group consisting of: epoxy resins, novalac-based resins, unsaturated polyester resins, vinyl ester resins, and combinations thereof.

21. The method of claim 13, wherein the polymeric material further comprises a fiber reinforcement.

\* \* \* \* \*